United States Patent

[11] 3,596,588

| [72] | Inventor | Tillman R. Moss |
| | | Renton, Wash. |
| [21] | Appl. No. | 875,043 |
| [22] | Filed | Nov. 10, 1969 |
| [45] | Patented | Aug. 3, 1971 |
| [73] | Assignee | General Electric Company |

[54] AUTOMATIC BEVERAGE MAKER
6 Claims, 4 Drawing Figs.

[52] U.S. Cl. .................................................. 99/282,
99/295, 99/302
[51] Int. Cl. .................................................. A47j 31/34
[50] Field of Search .......................................... 99/280,
281, 282, 283, 295, 300, 302, 304, 305, 307

[56] References Cited
UNITED STATES PATENTS

| 3,319,561 | 5/1967 | Bloomfield | 99/283 |
| 3,371,592 | 3/1968 | Remy | 99/282 |
| 3,385,201 | 5/1968 | Martin | 99/282 |
| 3,430,552 | 3/1969 | Renner | 99/283 |
| 3,450,024 | 6/1969 | Martin | 99/295 |

Primary Examiner—Robert W. Jenkins
Attorneys—Derek P. Lawrence, Lee H. Sachs, E. S. Lee, III, Frank L. Neuhauser, Oscar B. Waddell and Joseph B. Forman ABSTRACT: A small, compact beverage maker, particularly adapted for use in commercial aircraft and of the type which heats water and then passes the heated water through a beverage-producing material such as ground or powdered coffee, is provided with an improved protective control means related to the heating of water. Such control means affects the operation of water-heating means as a function of pressure in the water-heating container and temperature of the water heaters. In another form, such protective control means operates, in addition, as a function of liquid pressure, as a measure of volume, in a beverage server into which a brewed beverage is first deposited.

INVENTOR.
TILLMAN R. MOSS

INVENTOR.
TILLMAN R. MOSS
BY
ATTORNEY

AUTOMATIC BEVERAGE MAKER

AUTOMATIC BEVERAGE MAKER

This invention generally relates to automatic beverage makers, and more particularly, to such an apparatus which is small, compact and easily adaptable for use in vehicles to dispense a choice of heated water or other heated brewed beverage such as coffee.

In commercial passenger vehicles, such as aircraft, it is the usual practice to serve hot water-soluble beverages such as coffee, tea, hot chocolate, etc. Important considerations in the design of a maker and dispensers of such beverages are small size and lightweight as well as accurate performance and high reliability. However, one very important consideration is that the apparatus be safe to operate both from the standpoint of prevention of overheating of its water-heating tank under abnormal use conditions as well as prevention of overfilling of its beverage server in which the brewed beverage is first deposited.

It is a principal object of this invention to provide such a beverage maker including safe control of water heating under abnormal use conditions.

Another object is to provide such a beverage maker which coordinates such safe water-heating control with the control of brewed beverage collection.

A further object is to provide for such beverage maker an improved control which senses water volume in the water-heating tank and in the beverage server as a function of pressure.

Still another object is to include an improved water-heating tank overheating protective means positioned to respond more accurately to the temperature of the heating elements in the tank rather than solely to the temperature of the heated water.

These and other objects and advantages will be more fully understood from the following detailed description and drawings in which.

Briefly, the present invention in one form provides a beverage maker of the type which heats water and dispenses the heated water, or, alternatively, passes the heated water through a water-soluble beverage-producing material, such as ground or powdered coffee, and then collects for serving the beverage thus produced. The beverage maker includes an improved control which comprises pressure-responsive means to sense the pressure in a water-heating tank and an overheating-sensing device in the tank positioned adjacent the hotter portions of water-heating elements and responsive to the temperature of the heating elements rather than solely to the temperature of the water. In another form, the apparatus of the present invention includes, in addition, liquid-pressure-responsive means to sense the amount of brewed beverage in a beverage server. Either of the temperature or pressure-sensing means can terminate operation of the beverage maker in the event an unsafe condition occurs.

Figure 1:
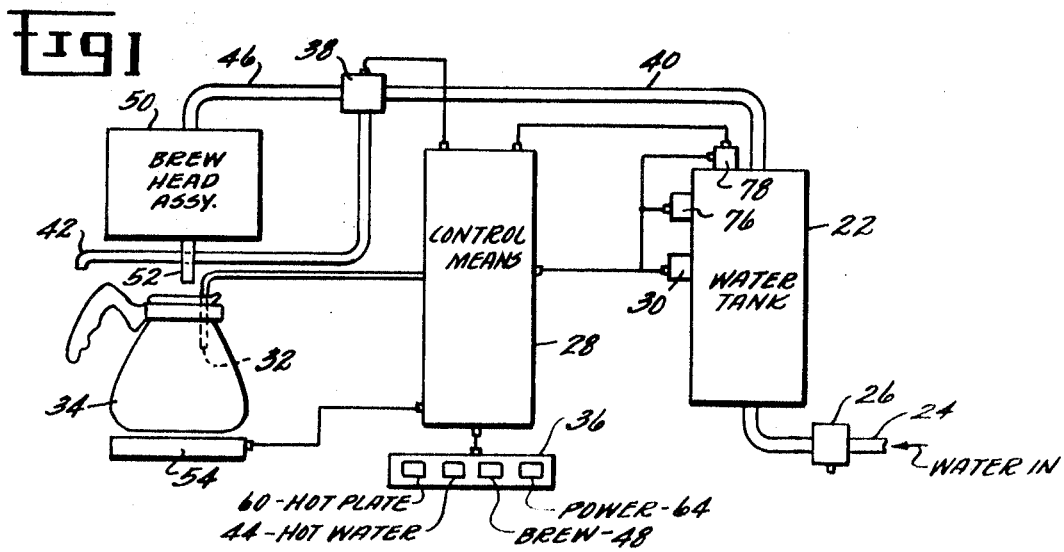
FIG. 1 is a diagrammatic presentation of the principal components of the apparatus of the present invention.

The apparatus to which the present invention relates is shown diagrammatically in FIG. 1. Water-heating container or tank 22 which includes an ordinary vent valve (not shown) for initial filling, receives through water inlet conduit 24 water from a water source, not shown, but which can be a water storage tank in an aircraft. Preferably included in conduit 24 is a water pressure regulator 26 to protect the apparatus from fluctuations in pressure which can occur in an aircraft water supply system. Water-heating tank 22 can be of the general type described in U.S. Pat. No. 3,447,560—Dodson et al., issued June 3, 1969 or pending application Ser. No. 835,292—Knox, filed June 2, 1969, both of which are assigned to the assignee of the present invention. More simplified tanks can also be used if desired, provided they are adapted with the features of the present invention.

Control means 28, the functional details of which will be described in connection with FIG. 2, includes a water-heating control portion and a waterflow control portion. Control means 28 coordinates operation of components associated with tank 22 including heating tank pressure sensor and switch 30 and, in one form of the invention, from liquid level pressure sensor 32 in beverage server 34. Sensing of the volume of liquid within server 34 as a function of liquid pressure eliminates various contamination and electrical contact or variable conductivity problems sometimes associated with other known weight-sensing or electrical-conductivity-sensing types of arrangements.

Responsive to an operator closing a switch on selector and indicator unit or panel 36, control means 28, under safe conditions to be described in connection with FIG. 2, allows operation of flow director valve means 38. Valve means 38 allows heated water to flow from the tank outlet flow conduit 40 either to hot-water-dispensing conduit 42, as a result of closing momentary hot water switch 44 associated with panel 36, or to brewing water conduit 46 as a result of closing brew cycle switch 48 associated with panel 36. However, control means 28 does not allow both to occur simultaneously.

If the brew cycle has been selected, water, the flow of which is controlled at least partially through use of sensor 32 in server 34, is passed into a beverage-brewing means such as brew head assembly 50. There it contacts a beverage-producing material such as ground coffee. One typical brew head assembly will be discussed in connection with FIG. 3. After brewing, the brewed beverage flows by gravity through brewed beverage outlet 52 into server 34. Flow continues until the flow of heated water from tank 22 through flow director valve 38 into brew head assembly 50 is stopped by control means 28 when the pressure of liquid in server 34 reaches a preselected level measured by pressure sensor 32.

If hot water has been selected to be dispensed, momentary hot water switch 44 associated with panel 36 is activated. Then flow director valve 38, through control means 28, passes heated water from conduit 40 through conduit 42 so long as switch 44 is held closed by the operator. Operation of such hot-water-dispensing cycle is independent of that portion of control means 28 affected by sensor 32 because dispensing of hot water occurs only so long as switch 44 is held closed by the operator. However, as was stated before, hot water cannot be dispensed during operation of a brewing cycle.

The apparatus can include a thermostatically controlled beverage server heater or hotplate 54. However, hotplate 54 need not be used because there are available commercially beverage servers capable of retaining liquids heated for relatively long periods of time.

Figure 2:
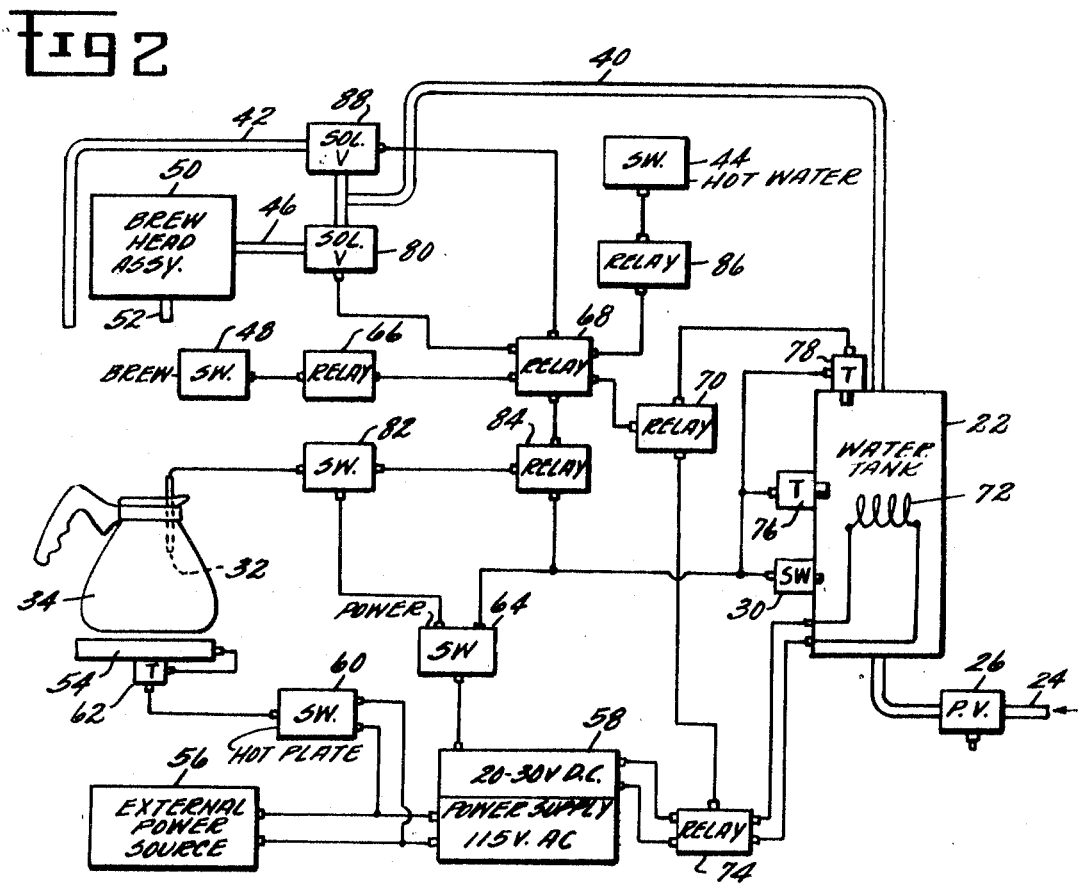
FIG. 2 is a schematic block diagram presentation of the hydraulic and electrical circuitry of the apparatus of the present invention.

A discussion of the block-type, partially schematic presentation of FIG. 2, in conjunction with FIG. 1, will give a more complete understanding of the present invention. All of the relays, coils, contacts, solenoids, etc. are standard commercial items obtainable from a variety of sources and operate between 20—30 volts DC. It will be understood, however, that other devices which perform the same function, for example, integrated circuits or miniaturized transistorized circuits can be used where appropriate.

Electrical power from an external power source, such as the 110—120 volts AC electrical-power-generating apparatus of an aircraft, is made available to power supply 58 and concurrently to beverage server heater 54. Power to heater 54 is initiated by closing hotplate or heater switch 60, associated with panel 36. Power to server heater 54 is responsive to thermostat 62 which can be mounted in the base of heater 54.

Power supply 58 transforms a portion of the incoming electrical power from 110—120 volts AC to 20—30 volts DC for use by the components in the circuit of control means 28.

Power to the control circuit is initiated by closing main control or power switch 64, associated with panel 36. Switch 64 makes the DC electrical power available to other components as appropriated. The operator can select the "brew" cycle by closing brew cycle switch 48 associated with panel 36. Through the self-latching circuit of relay 66, master control relay 68 is armed until water-heating tank control relay 70 is operated as a result of water in tank 22 reaching heated operational condition. Water in tank 22 is heated by heater 72, such as of the resistance type, powered through power relay 74, the power to which is controlled by temperature-responsive operation of water temperature thermostat 78 and tank control relay 70.

One unique feature of the present invention is a heating and waterflow control means responsive to sensing of abnormal conditions of pressure within the tank and temperature of the water-heating elements. One component is pressure sensor and switch 30, shown in series circuit with the second component, the overheating thermostat 76. Together these components along with water temperature thermostat 78 control the operation of a control means including water heater control relay 70. Relay 70, in turn, controls the operation of relay 74 controlling power to heater 72 and also operates master control relay 68 when the water-heating tank is in heated operational condition. Relay 68, in turn, controls operation of waterflow valves 80 and 88.

The pressure sensor and switch 30 for tank 22 has been introduced to sense water pressure in such tank under normal operating conditions, thus to determine when tank 22 is filled sufficiently with water to allow heating to occur. Normally, when empty or filling, tank 22 is vented to atmosphere by ordinary means, not shown, such as a vent valve. Hence, until water has been introduced, atmospheric pressure exists within the tank. As water is added, the air is usually expelled. When the tank is filled, the vent is closed and water pressure builds up within the tank to a preselected limit. When the limit is reached, the switch in sensor and switch 30 closes allowing current to flow to relay 70 under normal temperature conditions.

However, such pressure sensing alone cannot avoid an abnormal use condition in which the vent becomes sealed prematurely or is clogged and the tank is filled only partially with water such as allowed by a balance between inlet water pressure and the pressure of air compressed in the tank. The surface temperature of those portions of heater elements 72 operating in air would rise rapidly. Under such undesirable conditions, without other controls heater 72 would still function though at a very high surface temperature, for example, about 1,000° F. because of at least partial operation in air. When contacted by cooler water, if water is subsequently introduced, such as a result of opening of the vent, steam would be created violently and an explosion could occur. Thus, the present invention combines the functions of overheating thermostat 76 with pressure sensing and switching means 30 as a safety feature of tank 22. Such thermostat 76 is positioned adjacent the principal heating portions of heater 72 and is adjusted to respond to the temperature of heater 72 rather than solely to the temperature of water within tank 22. If an overtemperature condition occurs, thermostat 76 opens the circuit to relay 70 which in turn stops the operation of heaters 72 and flow of water in the beverage maker. Thermostat 76 is set to respond to a temperature higher than water temperature thermostat 78 because its function is to respond to a higher temperature created at the surface of heaters 72. Thus, even if there is pressure but insufficient water in tank 22, the combination of sensor and switch 30 with the overheating thermostat 76 will open that circuit to tank control relay 70 to terminate power to heater 72 through relay 74. In turn, relay 70 operates master control relay 68 because tank 22 is not in heated operational condition and stops flow of water to brew head 50. Hence the brew cycle cannot proceed. This safety feature can prevent accidents not contemplated by known apparatus.

If water-heating tank 22 is in heated operational condition for a brew cycle, relay 70 allow current to flow through relay 68 and, at the same time, relay 66 circuit drops its latch. Relay 68 then provides power to brew waterflow control valve 80, such as a solenoid-operated valve. Valve 80 allows heated water from conduit 40 to flow through conduit 46 into brew head assembly 50. Brewed beverage flows from brew head assembly 50 into beverage server 34 until the pressure of liquid in the server, as a measure of volume, has reached a limit set for the server through liquid level pressure sensor 32, such as of a type which produces the flow of electric current as a result of applied pressure. At that limit, sensor 32 signals transducer 82 which moves relay 84, operating master control relay 68 to stop flow of water through valve 80. Thus, another feature of the present invention is the use of a pressure-responsive sensor 32 in server 34 to control the brew cycle and to avoid overflow of liquid from server. In one form, such a pressure-responsive sensor can include a tube open at its lower end into the server and connected with a pressure-sensitive transducer. As liquid rises in the server 34, it compresses air in such tube and pressure is measured by the transducer which signals relay 84.

If hot water is selected to be dispensed by the operator, the closing of momentary hot water switch 44 activates relay 86 so long as switch 44 is maintained closed by the operator. Switch 86 operates master control relay 68 to isolate the brew cycle circuit and to pass current to hot waterflow control valve 88, such as a solenoid-operated valve. This occurs if tank control relay 70 is passing current to relay 68 as a result of tank 22 being in heated operational condition. Then, hot water from conduit 40 is allowed to flow from conduit 42 to dispense the hot water such as for tea, hot chocolate, etc. As was mentioned before, the brew cycle and hot-water-dispensing operation cannot be conducted concurrently. Master control relay 68 prevents such an occurrence by controlling independently the operation of valves 80 and 88.

Figure 3:
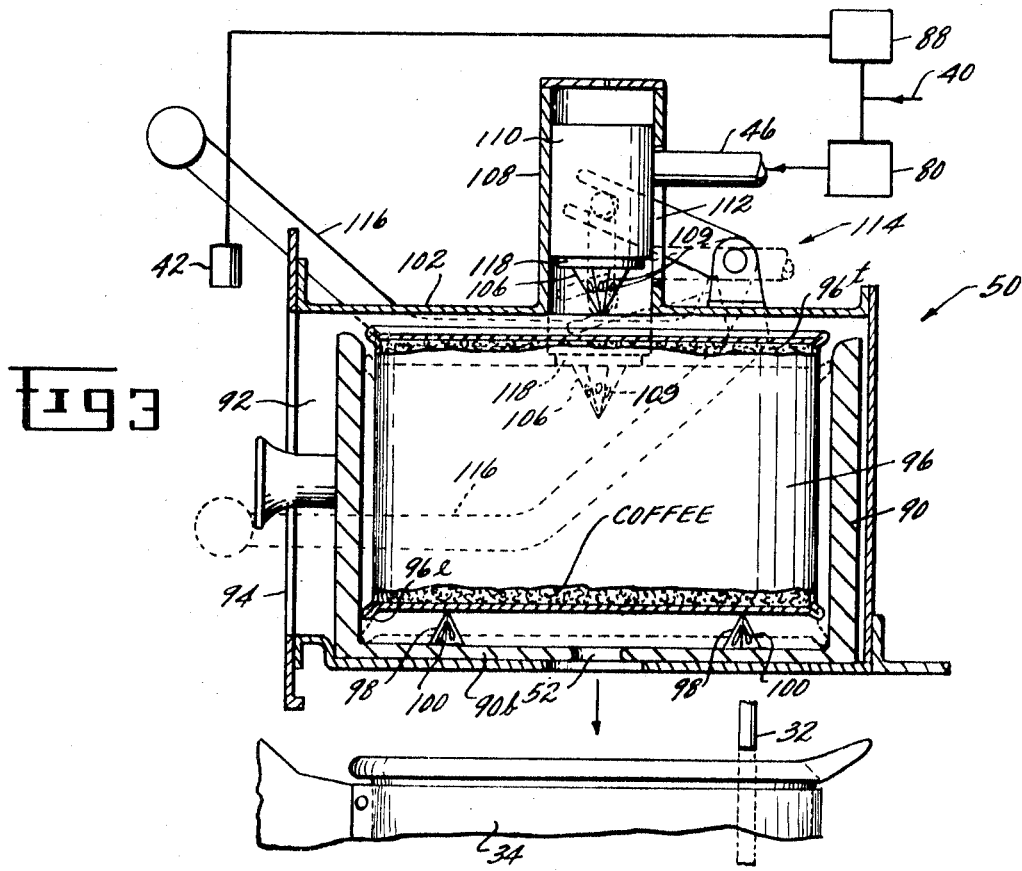
FIG. 3 is a fragmentary, partially sectional view of the brew head assembly of the apparatus of the present invention.

The brew head assembly 50 of FIG. 1 is shown in detail in one form in FIG. 3 in connection with the brewing of coffee. It will be recognized that a variety of forms can be designed to operate in the beverage maker of the present invention. In the form of FIG. 3, the apparatus is adapted to use a can in which coffee is contained. However, it should be understood that a variety of arrangements can be used depending upon the type of coffee package selected by the operator. For example, frequently coffee is packaged in small sealed cans, which can be perforated, or in "pillow" packs in which the coffee is enclosed in a filter-type bag.

In FIG. 3, a removable package receptacle 90 is adapted to fit into cavity 92 through opening 94 of the beverage maker. Receptacle 90 is open at the top to receive a coffee package such as sealed can 96 in which ground coffee is included. Secured to base 90b of receptacle 90 are sharpened base perforators 98 including coffee drain means 100 such as grooves. Also included in base 90b is a brewed beverage outlet 52 which, when in position with cavity 92, generally aligns with an opening in the lower wall of cavity 92.

Top wall 102 defining one limit of cavity 92 includes an opening through which top perforator 106 can pass as directed by a guide member such as a tube 108. Top perforator 106, which includes water outlet ports 109, is connected with a movable water manifold 110 to receive heated water from brewing water conduit 46. Conduit 46 is connected to manifold 110 through a slot 112 in a wall of guide member 108 to allow reciprocal movement of manifold 110 within guide member 108. Such movement is responsive to a manifold and perforator-moving means such as the lever means shown generally at 114.

In operation, lever means 114 is activated such as by an operator pulling down handle 116. The result is movement of top perforator 106 toward and through top 96t of can 96. Liquid seal 118, surrounding perforator 106, registers with top 96t forcing can 96 to the position shown in phantom in FIG. 3. At the same time, can bottom 96b, as a result of such movement, is perforated by base perforators 98 which then project along with top perforator 106 into the interior of can 96. However, can bottom 96b is maintained above receptacle bottom 90b such as through contact of peripheral lip or edge 96e of can 96 with the surface of bottom 90b of receptacle 90. This allows brewed coffee to drain by gravity from can 96 into receptacle 90 and then through brewed beverage outlet 52 into beverage server 34.

Once can 96 is in position, as shown in phantom in FIG. 3, the brew cycle can be initiated by the operator. Heated water from conduit 46 passes through manifold 110 and water outlet ports 109 in top perforator 106 into the interior of can 96 containing ground coffee. Brewed coffee resulting from contact between the heated water and the ground coffee passes by gravity from can 96 along grooves 100 of base perforators 98 into the bottom of receptacle 90. The brewed coffee then flows through brewed beverage outlet 52 into container 34 until pressure sensor 32 stops the cycle in the manner previously described. That portion of sensor 32 which projects into beverage server 34 is operatively connected with lever means 114. Thus sensor 32 can be removed from the server in its position shown in phantom in FIG. 3, by raising lever means 114. It is preferable that such lower portion of sensor 32 be of a flexible material, for example, a plastic tube, to allow server 34 to be removed from the beverage maker without damage to that portion of the sensor if the operator does not raise handle 116.

If desired in the form shown in FIG. 3 using coffee packaged in a can, a switch (not shown) such as in series circuit with brew waterflow valve 80, can be positioned to be responsive to movement of lever means 114 to allow operation of valve 80 to pass heated water into manifold 110 only after top perforator 106 and can 96 are in the position shown in phantom in FIG. 3.

Figure 4:
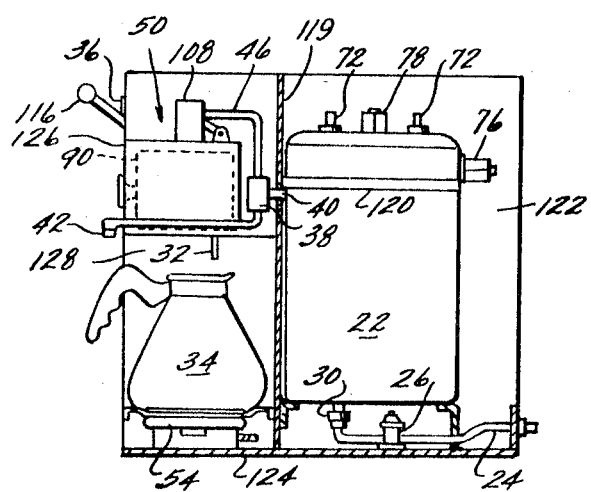
FIG. 4 is a partially sectional view of the beverage maker assembly.

A partially sectional assembly view of the beverage maker of the present invention is shown in FIG. 4. As was mentioned before, the beverage maker was particularly designed to be inserted in a space in a kitchen module of an aircraft. Therefore, an outer protective, decorative cabinet such as of the type generally designed for use in a restaurant is not necessary. However, it should be understood that such an outer cabinet can be made to enclose the apparatus of this invention if desired.

Referring to FIG. 4, tank 22 is mounted on inner wall 119 such as by a plurality of mounting clamps and straps 120, only one of which is shown. Inner wall 119 is mounted between the backwall 122 and base 124. Secured to base 124 is inlet water pressure regulator 26 which receives inlet water from conduit 24 and passes it, for convenience of mounting and design, through pressure sensor and switch 30 into tank 22. Mounted through the top wall of tank 22 are resistance heaters 72 and water temperature thermostat 78. Disposed through a sidewall of tank 22 is overheating thermostat 76 positioned appropriately near heaters 72 within tank 22 in the manner described above.

Heated water from tank 22 passes through conduit 40 into flow director valve means 38 and then either through conduit 46 or conduit 42 into brew head assembly 50 or for the dispensing of hot water in the manner described above.

Buttons for the operation of panel 36 are conveniently mounted on a front face 126 of the assembly. Such face includes a cavity 92 to receive package receptacle 90 as well as a beverage server cavity 128 including beverage server heater 54 on which beverage server 34 can be positioned to receive brewed beverage as described above.

What I claim is:
1. In a beverage maker comprising:
a water container including
  a. water-heating means, and
  b. first temperature-sensing means operating up to a first temperature in the container;
beverage-brewing means including means to deposit brewed beverage in a beverage server;
means to flow water through the container; and
means to flow heated water to the beverage-brewing means;
an improved protective control comprising, in combination:
  A. pressure-sensing and switching means operating in response to a minimum pressure in the water container;
  B. second temperature-sensing means operating in response to the temperature of the water-heating means up to a second temperature in the container greater than the first temperature; and
  C. a water heating and flow control, having a water-heating control portion and a waterflow control portion, responsive to the pressure sensing and switching means and to the second temperature-sensing means to operate the water-heating means and the means to flow water through the container when
    i. the pressure in the water container exceeds the minimum pressure as sensed by the pressure sensing and switching means, and
    ii. the temperature in the container is less than the second temperature as sensed by the second temperature-sensing means.

2. In a beverage maker as in claim 1, in which the improved protective control comprises, in addition, in combination with the beverage server into which brewed beverage is deposited:
a liquid level pressure sensor in the beverage server operatively connected with the water heating and flow control means and operating when liquid pressure in the server reaches a preselected level;
the water heating and flow control means being responsive to the liquid level pressure sensor in addition to being responsive to the pressure sensing and switching means and the second temperature-sensing means to operate the water-heating means and the means to flow water through the container when the liquid pressure in the beverage server is less than the preselected level.

3. In a beverage maker as in claim 1, in which:
the water-heating means is an electrical heater; the first temperature-sensing means is included in a first thermostat; and
the second temperature-sensing means is included in a second thermostat;
the second thermostat being in series circuit with the pressure sensing and switching means, the first thermostat and a water container control means;
the water control means being operatively connected between the water-heating control portion and the waterflow control portion of the water heating and flow control means.

4. In a combination with a beverage server, a beverage maker as in claim 1 comprising:
a water container including electrical water-heating means and a first thermostat operating to sense temperatures up to a first temperature in the container;
a beverage-brewing means through which heated water from the water container is passed and which includes means to deposit brewed beverage in the beverage server;
means to introduce water into the water container;
means to flow heated water from the water container to the beverage-brewing means;
a beverage maker control means controlling the heating of water in the water container and the flow of water through the water container and from the water container through the beverage-brewing means, the beverage maker control means including an improved protective control means comprising, in combination:
  A. pressure sensing and switching means operating in response to a minimum pressure in the water container;
  B. a second thermostat operating in response to the temperature of the electrical water-heating means up to a second temperature in the water container greater than the first temperature; and
  C. water heating and flow control means responsive to the pressure sensing and switching means and to the second thermostat to operate the electrical water-heating means and the means to flow heated water from the water container when i. the pressure in the water container exceeds the minimum pressure as sensed by the pressure sensing and switching means, and ii. the temperature in the water container is less than the second temperature as sensed by the second thermostat.

5. The beverage maker of claim 4 which includes, in addition:

a liquid level pressure sensor in the beverage server operatively connected with the water heating and flow control means and operating when the liquid pressure in the server reaches a preselected level;

the water heating and flow control means being responsive to the liquid level pressure sensor in addition to the pressure sensing and switching means and to the second thermostat to operate the electrical water-heating means and means to flow water from the water container when the liquid pressure in the beverage server is less than the preselected level.

6. The beverage maker of claim 4 comprising, in addition:

means to dispense heated water directly from the water container;

means to select from direct heated water dispensing and flow of heated water to the beverage-brewing means;

the beverage maker control means including direct dispensing control means and beverage-brewing water control means, the beverage maker control operating to deactivate one of such means in response to selection of the other means.